United States Patent [19]

Demonte et al.

[11] 4,091,446
[45] May 23, 1978

[54] DESK TOP ELECTRONIC COMPUTER WITH A REMOVABLY MOUNTED ROM

[75] Inventors: Filippo Demonte, Borgofranco d'Ivrea (Turin); Mario Figini, Bosco Marengo (Alessandria), both of Italy

[73] Assignee: Ing. C. Olivetti & C., S.p.A., Ivrea (Turin), Italy

[21] Appl. No.: 647,000

[22] Filed: Jan. 7, 1976

[30] Foreign Application Priority Data

Jan. 24, 1975 Italy .............................. 67146 A/75
Sep. 12, 1975 Italy .............................. 69275 A/75

[51] Int. Cl.$^2$ ..................... G06F 15/02; G06F 13/00
[52] U.S. Cl. ........................................................ 364/200
[58] Field of Search ................ 340/172.5; 364/900, 364/200; 235/156

[56] References Cited

U.S. PATENT DOCUMENTS

| | | | |
|---|---|---|---|
| 3,355,714 | 11/1967 | Culler | 340/172.5 |
| 3,469,244 | 9/1969 | Perotto | 340/172.5 |
| 3,495,222 | 2/1970 | Perotto | 340/172.5 |
| 3,533,076 | 10/1970 | Perkins | 340/172.5 |
| 3,573,746 | 4/1971 | Robinson | 340/172.5 |
| 3,588,841 | 6/1971 | Ragen | 340/172.5 |
| 3,593,313 | 7/1971 | Tomaszewski | 340/172.5 |
| 3,594,734 | 7/1971 | Wang | 340/172.5 |
| 3,610,902 | 10/1971 | Rahenkamp | 340/172.5 |
| 3,623,012 | 11/1971 | Lowry | 340/172.5 |
| 3,636,523 | 1/1972 | De Sandre | 340/172.5 |
| 3,691,531 | 9/1972 | Saltini | 340/172.5 |
| 3,760,171 | 9/1973 | Wang | 340/172.5 |
| 3,839,630 | 10/1974 | Olander, Jr. | 235/156 |
| 3,859,635 | 1/1975 | Watson | 364/200 |
| 3,971,925 | 7/1976 | Wenninger | 235/156 |
| 4,012,725 | 3/1977 | Spangler | 364/200 |

*Primary Examiner*—James D. Thomas
*Attorney, Agent, or Firm*—Schuyler, Birch, Swindler, McKie & Beckett

[57] ABSTRACT

An electronic computer is provided with a numerical keyboard, a microprogrammed CPU, as well as RAMs and ROMs, some of them of pluggable type. A pluggable ROM stores a plurality of programs and comprises a portion formed of an associated plurality of registers each one storing a jump instruction and the associated programs. The numerical addresses of said registers are represented by a series of numerals which can be entered by the keyboard. Programs can be entered from the numerical keyboard into a RAM memory, in form of a sequence of numerical codes, each code corresponding to a subroutine prerecorded in a ROM. Each program so "learned" by the computer can be repeatedly executed by depressing a fixed code on the keyboard.

16 Claims, 10 Drawing Figures

ROM LAYOUT

| KEYS | ROM LOCATION | | | |
|------|----|---|---|---|
| (00P) | 0 | JUMP MICROINSTRUCTION | ADDRESS | |
|       | 1 | BITS | | 128 |
| (01P) | 2 | JUMP MICROINSTRUCTION | ADDRESS | |
|       | 3 | BITS | | 126 |
| (02P) | 4 | JUMP MICROINSTRUCTION | ADDRESS | |
|       | 5 | BITS | | 183 |
| (03P) | 6 | JUMP MICROINSTRUCTION | ADDRESS | |
|       | 7 | BITS | | 203 |
| (63P) | 126 | JUMP MICROINSTRUCTION | ADDRESS | |
|       | 127 | BITS | | 856 |
|       | 128 | MICROPROGRAM | N° 0 | |
|       | 136 | MICROPROGRAM | N° 1 | |
|       | 183 | MICROPROGRAM | N° 2 | |
|       | 203 | MICROPROGRAM | N° 3 | |
|       | 623 | MICROPROGRAM | N° 63 | |
|       | 856 | MICROPROGRAM | N° 64 | |
|       | 1024 | | | |

FIG. 5

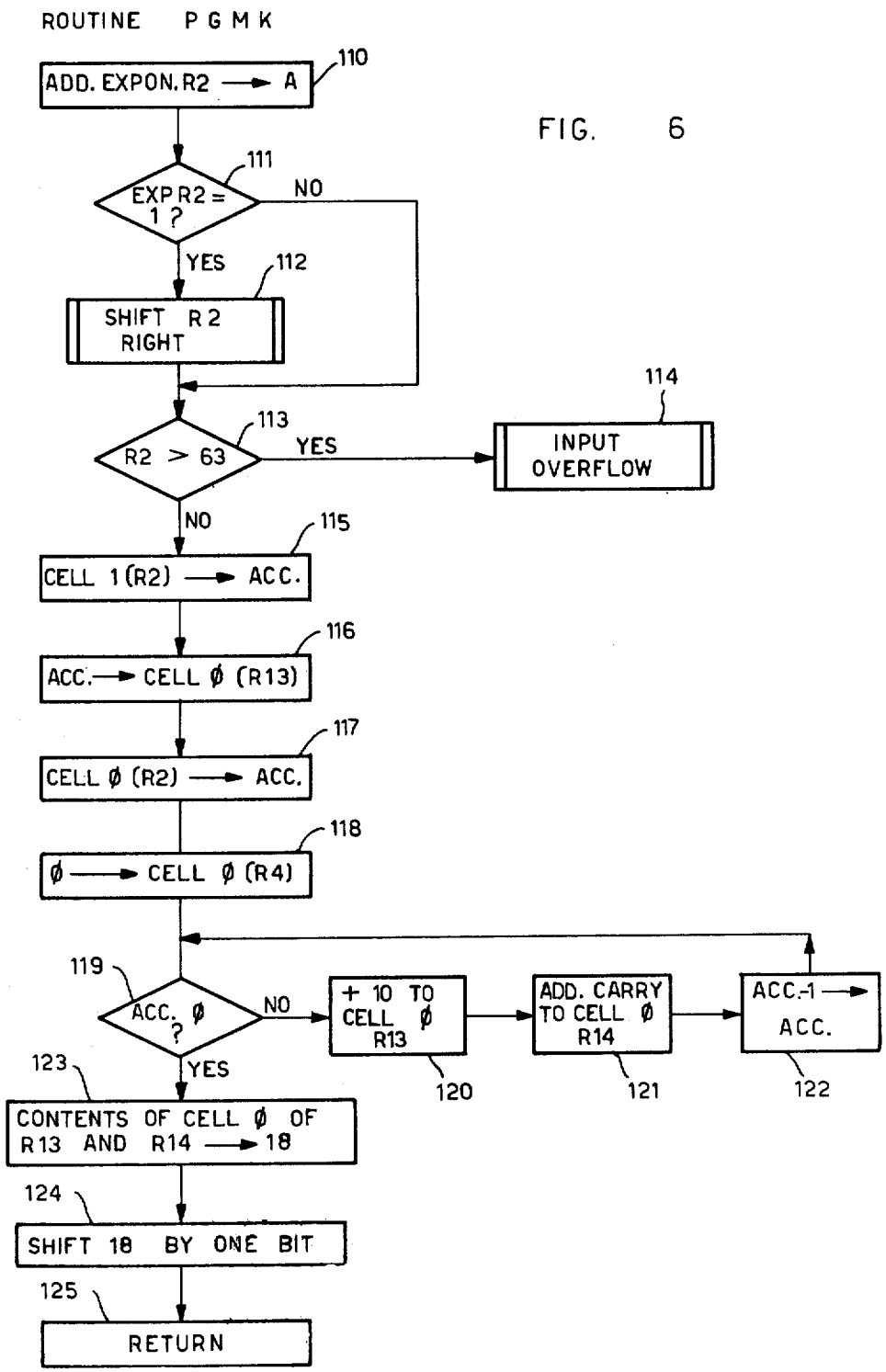

DESK TOP ELECTRONIC COMPUTER WITH A REMOVABLY MOUNTED ROM

CROSS REFERENCE TO RELATED APPLICATIONS

Applicant claims priority from Italian Pat. Application No. 67146-A/75 filed on Jan. 24, 1975 and No. 69275-A/75 filed on Sept. 12, 1975.

BACKGROUND OF THE INVENTION

1. Field of the Invention

The present invention relates to a stored program electronic computer with a keyboard for the input of data.

The object of the invention is to enable the user of the computer initially to compose, by means of the computer keyboard a complex program constituted by groups of fundamental operations, and then to cause the program to be executed repeatedly by simple acutation of a particular key of the computer.

2. Description of the Prior Art

Electronic computers known in the art, whether they are of microprogrammed type or not, may have programs recorded some time previously in the working memory, which therefore constitutes an element of the machine which is occupied permanently by the program. This, according to the different ability of the user, is so much more inaccurate and redundant the more he increases the occupation of the memory and the time required for bringing the program to a better qualitative level by successive improvements.

If there is added to this disadvantage that deriving from the simultaneous presence in a memory of a plurality of selectable programs, which require a calculation of the memory locations required by the various programs, it will be seen that a lot of knowledge and precautions are required of a normal user of computers having a program stored in this way.

There are other computers which have at their disposal a memory, generally a read-only memory, in which are recorded the various programs which can be called from the keyboard. The calling of a desired sequence of operations or programs compels the user to repeat the striking on the keyboard of the keys corresponding to each program whenever one of his programs must be executed. Above all, in the case of processing of complex programs with repetitive sub-programs, such as the preparation of accounting documents, statements or summaries, etc., this requirement leads to a considerable waste of time for each processing operation, in addition to a strong probability of making entry errors on the keyboard.

SUMMARY OF THE INVENTION

According to the present invention there is provided an electronic computer comprising a numeric keyboard for the input of data to be processed, a first memory for recording and reading data, a second memory for storing a series of programs and a central data processing unit under the control of the instructions of the programs, wherein the first memory is adapted to record a plurality of addresses of the programs in the second memory, control means being provided for commending the extraction of the addresses from the first memory and the consequent calling of the corresponding programs for the control of the central unit.

BRIEF DESCRIPTION OF THE DRAWINGS

The invention will be described in more detail, by way of example, with reference to the accompanying drawings, in which:

FIG. 5 is a diagrammatic representation of a program memory of the computer;

FIGS. 6 and 7 are two routine flow diagrams of the computer; and

GENERAL DESCRIPTION

Figure 1:
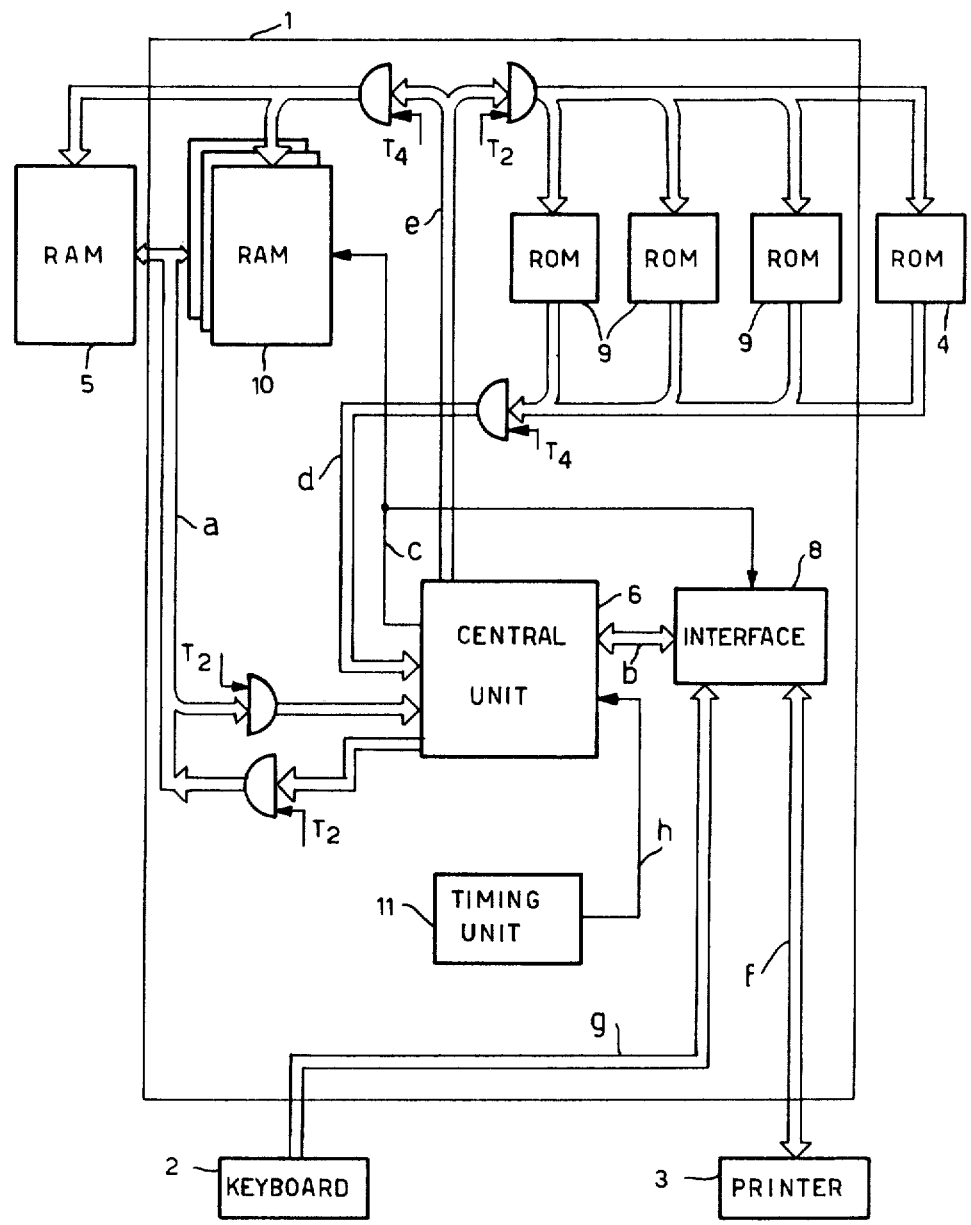
FIG. 1 is a block diagram of a computer embodying the invention.

FIG. 1 shows diagrammatically an electronic computer which comprises a basic processing unit 1, a data and instruction input unit, in particular a keyboard 2, and a data and instruction symbols output unit, in particular a printer 3. The computer moreover comprises a read-only memory (ROM) 4 for microprograms and a reading and writing memory (RAM) 5 for data, constants or partial results. Both the memories 4 and 5 are removable and can be connected to the basic unit 1 by the user himself.

The keyboard 2 and the printer 3 are of types known in the art and will therefore not be described in detail. The keyboard 2 and the printer 3 are adapted to exchange data and instructions with the basic unit 1 by way of the connectors f and g, respectively, which are constructed for transmitting an information byte in parallel.

The basic processing unit 1 includes a central unit 6 capable of processing data introduced from the keyboard 2. The basic unit 1 moreover includes one or more ROMs 9 of known type, more particularly three ROMs 9 in FIG. 1, each of which can contain 1024 microinstructions, which can be executed in response to the depression of function keys of the keyboard 2, for controlling the unit 6 in the processing of the data.

The basic unit 1 also includes a memory RAM 10 constituted by 16 modules, each adapted to permit writing and reading in 256 half-byte locations, for data, constants or intermediate results. A timing circuit 11 constituted essentially by an ordinary stabilized oscillator, with logic circuits not shown in FIG. 1, times the operations of the unit 1. Finally, an input/output interface 8 receives the signals coming from the keyboard 2 and from the printer 3 to bring them to the level and the waveshape required by the processing circuits.

The central unit 6 (FIG. 2) includes a register 20 for the input and output of data to and from the central unit from and to the memories, this register being connected to a four-bit accumulator 21 which, together with an adder 22, also of four-bit type, forms the arithmetic unit of the computer. The central unit 6 also includes a register 23 connected to a microinstruction decoder 24 connected in turn to a ROM addressing register 26. The accumulator 21 and the adder 22 are moreover connected to a register 25 for the input and output of data from and to the peripherals. A RAM addressing register 27 is moreover connected to the accumulator 21, while an output register 28 for the ROM or RAM addresses is connected to the two registers 26 and 27. The three registers 26, 27 and 28 are all twelve-bit registers. The central unit 6 moreover includes a register 18 for preserving the ROM addresses which is connected to the addressing register 26 and serves to store a ROM address temporarily in the program jumps. Finally, the central unit 6 includes a sequence logic network 19 connected at its inputs to the timer 11 (FIG. 1) through a connection h and to the decoder 24 and adapted to generate as output, in known manner, a series of commands and enabling signals for the various operations of the central unit.

The central unit 6 is adapted to exchange four-bit data with the RAM 10 in both directions through the register 20 along a connection a. Moreover, the unit 6 is adapted to exchange data in both directions through the register 25 along a connection b with the interface 8. Finally, the central unit is adapted to receive selectively from the ROMs 9, along a connection d and through the register 23, one microinstruction at a time constructed out of eight bits, which controls the operation of the unit. In addition to the function code, each microinstruction also comprises the address of the register of the RAM 10 containing the datum to be processed.

Each internal ROM 9 is addressed by the 12-bit register 26 (FIG. 2) through the register 28 and the connection e with 12-bit parallelism. In the address of each microinstruction, the frist two bits from the right (bits 1 and 2) serve to address one of the four ROMs, the other ten bits (bits 3 to 12) address the individual location (microinstruction) among the 1024 existing in the ROM 9. Each ROM 9 may be regarded as a memory module composed of 16 pages of 64 positions each, for which reason 4 of the 10 location bits identify the page and the other six the position.

In the internal ROMs 9 there are recorded various microprograms, each of which may be constituted by variable number of microinstructions. Each microprogram is selected by addressing the first microinstruction of the microprogram itself. The following microinstructions of the same program are addressed in known manner by incrementing the address or by means of jumps. The jump is indispensable every time a jump is made from one ROM 9 to another ROM 9 or from one page to another of the same ROM 9.

The external ROM 4 may be of known semiconductor type, in particular of MOS type. The ROM 4 has a capacity of 2048 bytes, for which reason it may be regarded as being composed of two modules arranged in 16 pages of 64 bytes each. Since each byte contains a microinstruction, 64 microinstructions may be contained in a page. If a microprogram is composed of more than 64 microinstructions, it occupies a plurality of ROM pages and to pass from the sixty-fourth to the sixty-fifth microinstruction a jump microinstruction to the first location of the following page is necessary.

To this end, the ROM 4 is also addressed by the ROM addresser 26 (FIG. 2) on the connection e, since each microinstruction is addressed by 12 bits. The addresser 26 behaves in reality like a double register of 6 + 6 bits, so that incrementing by one is not propagated beyond the sixth bit, whereby the configuration "111111" is followed by the configuration "000000". Therefore, the seventh bit, that is the first bit of the second half register, does not change from its own preceding binary state. One of the 6-bit half registers of the register 26 is used for selecting the byte of the page, while the other register is used for selecting the ROM 4 itself and the page. More particularly, the first two bits on the right of this last register, as already seen, select the two modules of the ROM 4, which are thus rendered equal to the internal ROMs 9. The other four bits of this register, on the other hand, select the 16 pages of the selected module. Therefore, for the purpose of passing from one page to the following page of the ROM 4, it is necessary to execute a jump microinstruction to a subroutine, in the address part of which there is contained the address of the new page to which the jump is to be made.

The microprograms of the external ROM 4 constitute, for the major part, variations of the similar microprograms of the internal ROMs 9 and are designed for the needs of a particular user. They are consequently oriented for the particular application (accounting statements, invoices, pay slips, etc.). The user therefore resorts to the ROM 4 when he needs not only simple mathematical operations, the programs of which are in the ROMs 9, but also a suitable succession thereof, appropriately devised for solving a specific problem, with a very close correlation between instants of computation and instants of printing. Moreover, in the external ROM 4 there are provided microprograms which perform functions different from computation, such as the printing of a constant value contained in a register, the feed or advance of the printing form, the shifting of the movable printing element, and so on.

The RAM 10 is addressed by the addresser 27 through the same register 28 and the connection e, but at different periods of the cycle time, as will be explained hereinafter. Of the twelve bits used, the first four address (bits 1 to 4) the particular module of the RAM 10 among the 16 different possible modules and the other eight bits (bits 5 to 12) address the individual location among the 256 existing in each module.

Each module of the RAM 10 is arranged in 16 registers R1-R16 (FIG. 3) each of 64 bits, constituting 16 4-bit half-bytes. In the registers R1-R8 as many numeric data can be represented in floating point form. The registers R9 and R10 serve as keyboard buffers for accommodating 8-bit codes corresponding to both numeral and function keys depressed on the keyboard 2 (FIG. 1) by the operator.

The register R11 and nine half bytes of the register R12 serve as an output buffer for accommodating the codes of the data which must be transmitted to the printer 3. The remaining memory locations are occupied by auxiliary information (program switching elements, counters, etc.), as will be seen better hereinafter.

The timing circuit 11 (FIG. 1) is adapted to generate cyclically a sequence of four signals T1, T2, T3 and T4. Under the control of these signals, the central unit 6 executes at each cycle, in known manner, the following operations:

(a) it zeroizes the ROM and RAM address inputs (signals T1 and T3);
(b) it addresses a ROM and reads or writes in the RAM (signal T2);
(c) it addresses a RAM, extracts and executes a microinstruction (signal T4).

Each operation of the computer is effected by means of the execution of one or more microinstructions by the central unit 6. For the execution of a microinstruction, the relative address is first entered in the address register 26. Under the control of a command X generated by the network 19 in the time T2, this address is sent to the register 28, which through the connection e addresses, in known manner, the relative ROM 9 or the ROM 4 (FIG. 1).

Figure 2:
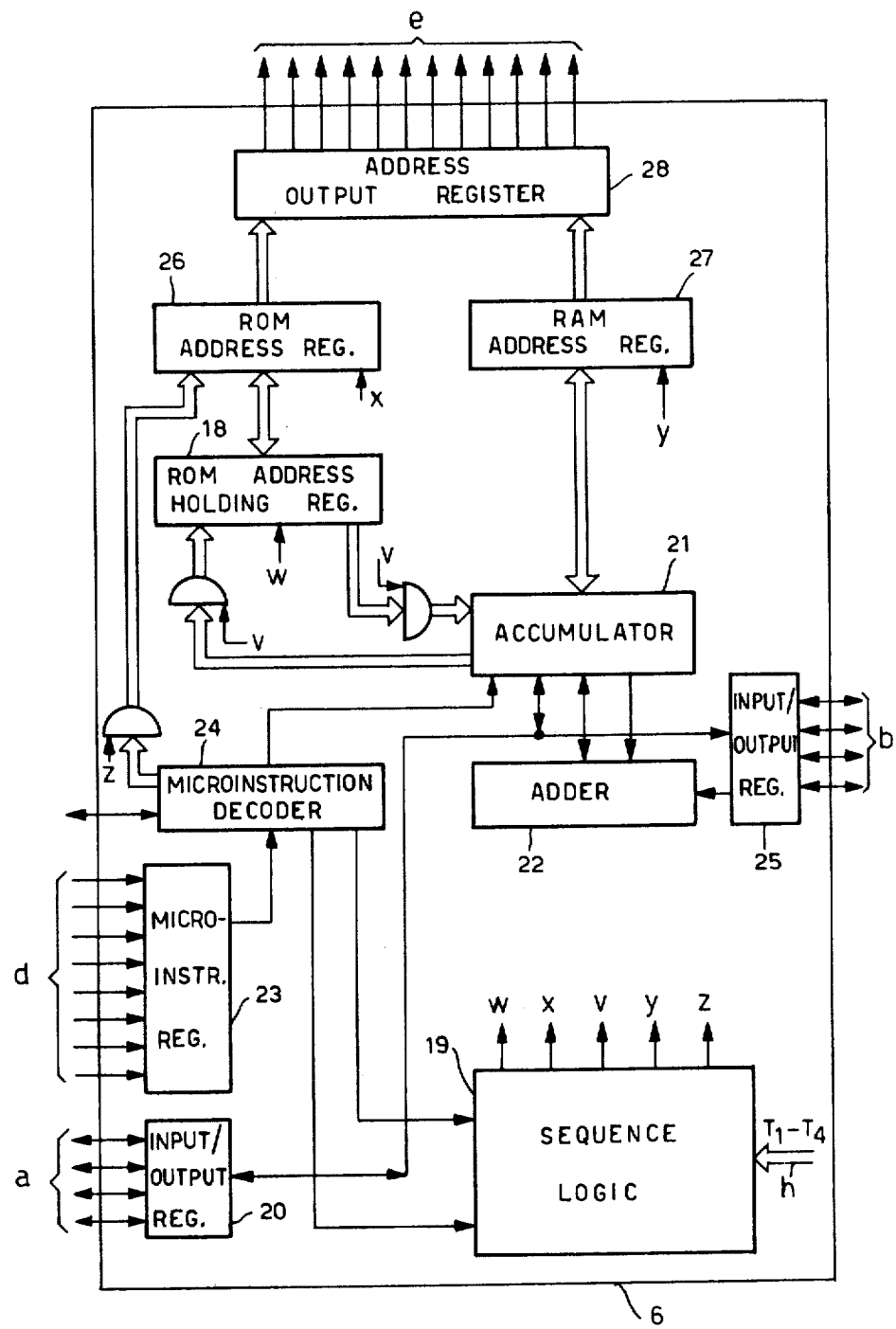
FIG. 2 is a representation of the central unit of the computer.

In the following time T4, the microinstruction addressed in this way is transferred by means of the connection d to the register 23 of the central unit 6 (FIG. 2). In the next time T3, the microinstruction extracted in this way is sent from the register 23 to the decoder 24, while the RAM and ROM inputs are zeroized.

The function code of the microinstruction is sent from the decoder 24 to the sequence logic network 19; the address of the datum has been sent to the accumulator 21. This address is now transferred to the addressing register 27 which, under the control of a signal Y generated by the network 19 in the time T4, is transferred to the register 28. This address passes through the connection e and addresses the RAM 10 or the RAM 5.

In the following timing cycle, in the time T2, the reading or writing of the datum of the RAM 10 or the RAM 5 addressed in the time T4 of the preceding cycle is caused through the register 20 and the connection a. Selection between reading and writing is controlled by the type of microinstruction used and is commanded through the register 20 and the connection a. At the same time, the following microinstruction of the ROM is addressed by means of the addresser 26. To this end, if the microinstructions to be used are disposed in succession in the ROM, the register 26 is normally incremented after commanding an addressing operation, by means of the accumulator 21 and adder 22. Therefore, it is clear that in the timing cycle in which a microinstruction is addressed and extracted the preceding microinstruction is executed.

If, on the other hand, a microinstruction to be executed is not disposed in sequence with the preceding one, the latter must be a jump instruction and contain the address of the microinstruction to which it is desired to jump. In this case, the new address is forced to the register 26 from the decoder 24 by means of a signal Z and used for the new addressing operation.

The jump may be used to insert a particular routine into the performance of a program or microprogram once or a plurality of consecutive times. In this case, when the register 26 is so forced, its contents are transferred by a command W of the network 19 to the preserving or holding register 18 in manner known per se. In such case, the last microinstruction of the routine or of the series of routines is a microinstruction for return to the main program. This microinstruction is sent by the decoder 24 to the network 19, which generates a command V. This causes the transfer of the contents of the holding register 18 to the register 26, which is thus restored with the address following that of the jump microinstruction of the main program, which can thus resume its execution. It is obvious that a plurality of holding registers 18 may be provided so as to be able to have jumps to routines of different levels, that is so as to be able to have a plurality of routine nesting levels.

As already seen, in addition to the accumulator 21 being connected to the RAM interface register 20, it is also connected to the register 25 for connection to the external interface. The selection of the exchange of data between the central unit 6, on the one hand, and the RAM 10 and the RAM 5 or the external interface 8 (FIG. 1) is commanded by a bit of each input and output processing microinstruction, which bit is decoded by 1 if it is necessary to read or write in a RAM and by 0 if it is necessary to exchange data with the peripherals.

To this end, a bit 1 is emitted by the decoder 24 of the central unit 6 (FIG. 2) on a connection c in response to a microinstruction for reading and writing in the RAM 5 or the RAM 10 (FIG. 1). This bit 1 causes in manner known per se, by way of the connection to the central unit 6, reading and writing in the cells addressed in the RAM 5 or the RAM 10 in the time T2.

The same connection c, if energized by a bit 0 emitted by the decoder 24 of the central unit 6 (FIG. 2) in response to a data input/output microinstruction, inhibits the selection of the RAM 5 and the RAM 10. Moreover, the same bit 0, by way of the register 25 of the central unit 26 and the connection b (FIG. 2), enables the interface 8 to exchange, in the following time T2, the datum present at the interface 8 with the contents of the accumulator 21 of the central unit 6 (FIG. 2).

Manual and automatic operation

As already seen, the computer is of the microprogrammed type, so that each operation is effected by means of microprograms which are recorded in general in the three ROMs 9 and can also be recorded in the external ROM 4. On the switching on of the machine, a microprogram is automatically called from one ROM 9, which microprogram, after attending to the establishment of the initial conditions (zeroizing of registers, positioning of switching elements, etc.), begins to execute a cyclic examination of the keyboard buffer R9, R10. In this way, the data entered and the function keys operated on the keyboard 2 are distinguished.

Figure 3:
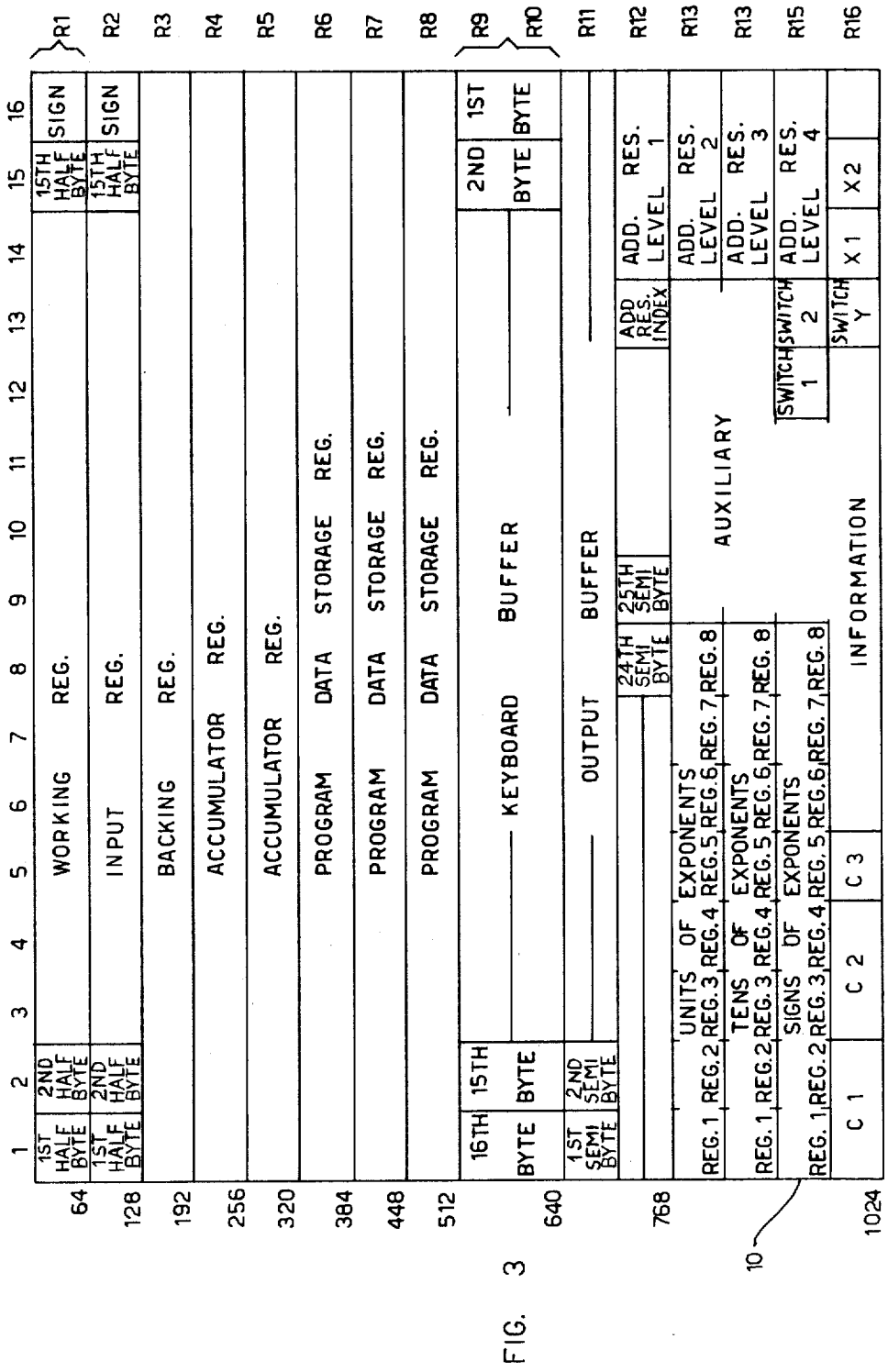
FIG. 3 is a diagrammatic representation of the working memory of the computer.

The computer is adapted to operate both on a manual basis and on a programmed basis. On the manual basis, the external ROM 4 is not used and could be removed from the machine. The user, on the other hand, makes use of the keyboard 2 (FIG. 4), which includes a numeric section 30 adapted to enter the digits 0 to 9 with the algebraic sign and the decimal point in the keyboard buffer R9, R10 (FIG. 3). The section 30 (FIG. 4) includes a key KB-CL 29, which serves to erase the last datum entered, but not yet used, in the keyboard buffer R9, R10, replacing it by the last datum printed.

The keyboard 2 moreover includes a function section 31 constituted by a set of function keys which command the respective functions. By means of the corresponding codes entered in the keyboard buffer R9, R10 and transferred to the register 26 of the central unit 6 (FIG. 2) in the manner seen before, these keys address microprograms contained in the ROMs 9.

More particularly, an addition key 32 commands the addition, in the accumulator register R4 of the RAM 10 (FIG. 4), of the last datum entered and printed. If the key 32 is actuated without preceding entry of a datum, it causes the addition in the accumulator R4 of the last number already added. A subtraction key 33 serves to subtract the last number entered from the register R4. A multiplication key 34 and a division key 35 serve to prearrange the operations of multiplication and division, respectively, between a first number in the register R2 and a second number in the register R3. The key 34, actuated consecutively alternately with the data, serves to effect chain multiplications and, actuated twice consecutively, serves to command the square.

An equals key 36 causes the execution of the operation on the last datum entered, with printing of the result of a multiplication or division previously entered. A key =% 31 serves to compute a discounted or reduced amount or an increased amount. A partial total key 38 serves to obtain the printing of the contents of the accumulator register R4 after transfer to R2 without zeroizing the register R4. A general total key 39 serves to obtain printing and zeroizing of the contents of the accumulator R4 after transfer to R2.

The ROM 4 generally contains a predetermined number of microprograms. By way of example, FIG. 5 shows a particular arrangement of a module of 1024 bytes of the ROM 4, in which 64 different microprograms are provided. The locations of the module of the ROM 4 are numbered from 0 to 1024. The first 128 locations thereof, which constitute the first two pages of the module, contain jump microinstructions and are in one-to-one correspondence with the numeric codes of the microprograms which it is necessary to tap out on the keyboard to select the microprogram, as indicated in the diagram of FIG. 5. Each of these 64 microinstructions addresses the location of the first microinstruction of the corresponding microprogram, thus leaving to this the control of the base unit 1. For example, the microinstruction 3, called by the numeral key 3, as will be seen hereinafter, is an instruction for jumping to the microinstruction at location 203, which begins microprogram No. 3.

To this end, the section 30 of the keyboard 2 (FIG. 4) moreover includes a program key P 41, which is actuated to cause the machine to pass from the manual basis or mode to the programmed basis or mode. That is, the machine prearranges itself to execute the microinstructions which make up the microprograms of the external ROM 4 (FIG. 1) inserted in the machine by the user for executing a particular computation. In this mode, the keyboard 2 is usable both in the numeric section 30 (FIG. 4) and in the function section 31.

If, after entry of a number in the keyboard buffer R9, R10 by means of the numeral keys, the key 41 is actuated, the microprogram analyzing the keyboard buffer R9, R10 causes the addressing in the ROM 4 of a microprogram corresponding to the number entered, which thus assumes control of the machine. The microprogram analyzing the keyboard buffer R9, R10 thus provides for identification of the code of the key 41 during the process of recognition of the characters introduced from the keyboard and for yielding control of the central unit 6 to the microprogram of the external ROM 4 corresponding to the numeric code entered before operation of the key 41.

With the arrangement of the ROM 4 as in FIG. 5, the 64 microprograms can be selected by means of the numeral keys followed by the key 41. The microprograms of the ROM 4 addressed by the keys 3 to 8 preceded by 0 correspond to the functions of the keys 34 to 38, which, however, address like programs recorded in an internal ROM 9.

Each microprogram may be self-sufficient or require the execution of a further microprogram for completion of the processing. In the first case, the microprogram executed brings a switching element SWITCH Y of the register 16 (FIG. 3) of the RAM 10 to 0, in the second case, on the other hand, it brings this switching element to 1. At the end of the execution of the program, control of the machine always returns to the microprogram analyzing the keyboard buffer R9, R10, which, in dependence upon the state of the switching element SWITCH Y, addresses the next microprogram of the ROM 4 according to the contents of this buffer or brings the machine back to the manual mode.

More particularly, in the event of the processing requiring a further microprogram, at the end of the processing of the first microprogram, control of the central unit 6 returns to the microprogram analyzing the keyboard buffer R9, R10, which, as before, provides for identifying the code of the following number followed by the key P41 and for yielding control of the central unit 6 to the microprogram corresponding to the digits which precede it. The conditions under which the code of the key P41 is identified and used to access the microprogram corresponding to the numeric code entered before actuation of the key P41 are identical to those valid for the case of the calling of a single microprogram.

Each microprogram ends with a microinstruction adapted to signal the end of the operations by displaying, for example on the output unit 3, a suitable character. At this point, the user is able to perceive the availability of the central unit 6 for processing a fresh microprogram and can therefore select this microprogram by tapping out the corresponding code on the keyboard 2.

For access to the external ROM 4, the numeric code of the desired microprogram tapped out on the keyboard 2 enters the keyboard buffer R9, R10 followed by the code of the key 41. The microprogram analyzing the keyboard buffer R9, R10 receives from this second code the indication to interpret the first numeric code not as data to be processed, but as microprogram address and puts it into the ROM addresser 26 (FIG. 2).

The numbers entered by means of the numeral keys which are not followed by entry of the key 41 represent variable data which are processed by the previously called microprogram. By means of the key 41 or the various function keys of the function section 31, this data may also be entered during the execution of a microprogram, inasmuch as, having been entered in the keyboard buffer R9, R10, it remains at the disposal of the microprogram which extracts it only at the moment of use thereof, as will be seen better hereinafter.

It is to be noted that with the switching element SWITCH Y at 1, the machine can remain in the programmed mode even if, after the execution of a microprogram, the machine stops. In this case, by actuating one of the function keys 34-38, the corresponding microprogram in the ROM 4 is addressed for which reason there are in the ROM 4 five microprograms which can be addressed alternatively both by the function keys, and by numeral keys followed by the key 41. For example, the multiplication microprogram can be called either with the key 34 or with the numeral key 4 followed by the key P.

In this case, the keys 34-38 are selectively enabled for use by a suitable microinstruction of the program processed, which microinstruction thus makes possible for the user the selection, in mnemonic manner, of various operations not defined by the main program, but which can be inserted in the program selectively only at the instant of its use, case by case.

The addition key 32 actuated with the switching element SWITCH Y in the 1 state, after a numeric entry, instead of causing the addition in the accumulator of the number previously entered, signals the end of the numeric entry to the microprogram analyzing the keyboard buffer and causes the execution of the microprogram to be resumed, thus acting as a function bar. Also, in the event of the key 32 being actuated without any numeric entry, it causes the zeroizing of the register R2 after transferring its contents to the register R3, for the purpose of being able to re-use these contents afterwards.

The subtraction key 33, with the switching element SWITCH Y in the 1 state, constitutes a program condition stored in one of the locations of the register 16 of the RAM 10 which are reserved for auxiliary information. As will be seen hereinafter, this condition is subsequently examined by a conditional jump microinstruction.

With the machine in the programmed mode, the register R1 and the register R2 respectively contain the first and the second operand in the addition, subtraction, multiplication, division and percentage operations. The result goes to the register R1. The register R3 also serves in this case as a backing register during multiplication and division. At the end of multiplication, it contains the first operand, while the result goes to the register R1. At the end of division, the register R3, on the other hand, contains the remainder. Therefore, in contrast to manual operation, the results now go to the register R1 instead of to the register R4.

The registers R4–R8 are used as storage registers for data, which are first exchanged with the contents of the register R2 and then processed together with the contents of the register R1. At the end of operation, exchange is again effected between the register R2 and the starting register R4-R8. Therefore, the registers R4-R8 preserve the datum to be processed until a new datum is recorded therein, so that all the registers R1-R8 behave as working registers.

Handling of programs entered from the keyboard

Figure 8:
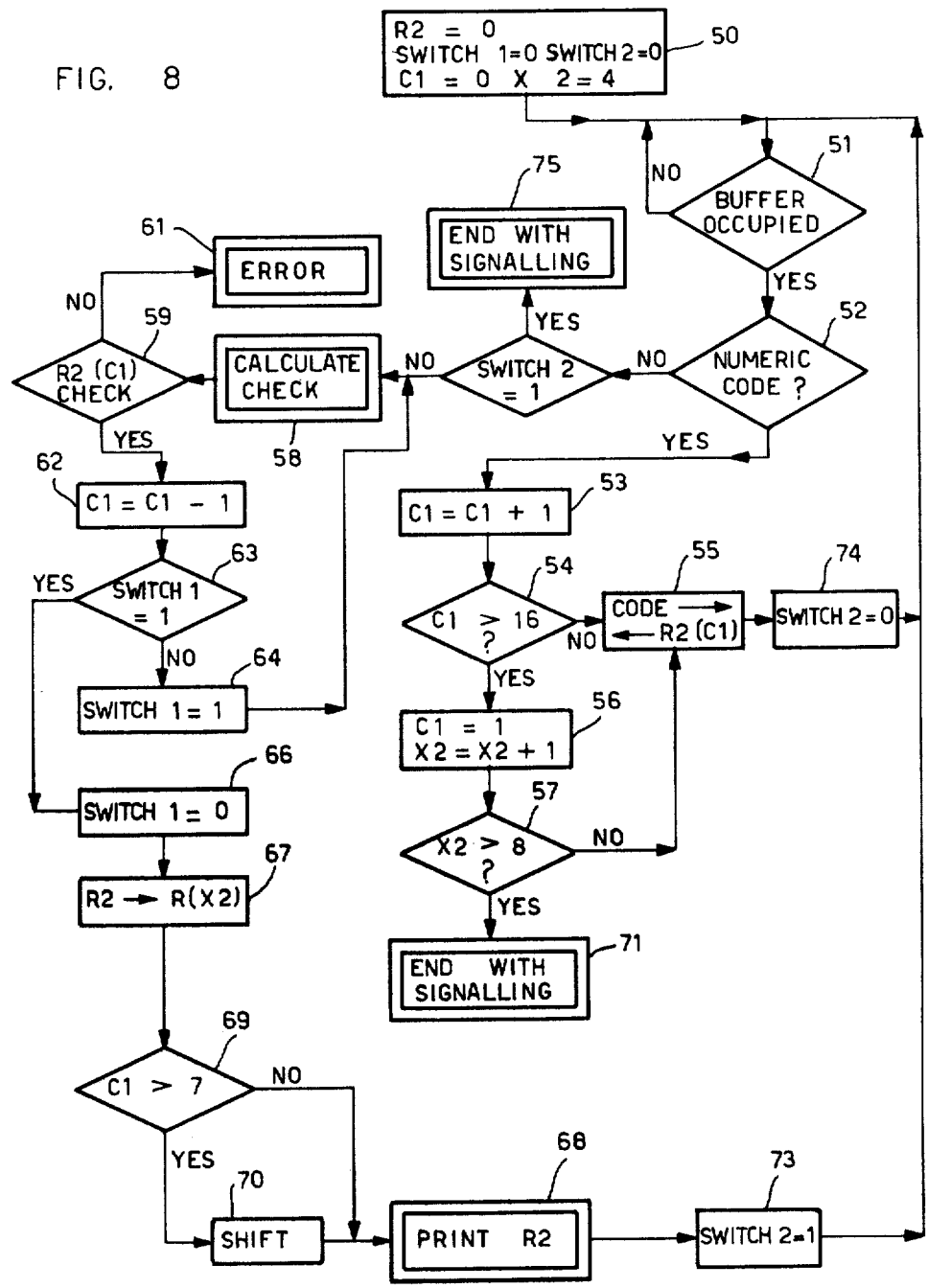
FIGS. 8 and 10 are three flow diagrams of two programs of the computer.

In addition to the possibility of calling an individual microprogram from the ROM 4, the user can tap out a plurality of codes for calling as many microprograms in succession. To this end, in any one of the ROMs 4 there are provided two special microprograms which serve for handling the programming from the keyboard. One of these microprograms is the autoinstruction microprogram hereinafter called A. This can be called by the numeral key O followed by the key P41 and, following the conditions of the diagram of FIG. 8, provides for the storage in the RAM 10 of the microprogram codes successively introduced by the user by means of the numeric keyboard, after suitable regrouping, as will be seen better hereinafter. Moreover, the microprogram A provides for verification of the accuracy of these codes entered in this way by means of check digits which the user enters at the end of each group of codes. The microprogram A provides for the printing of the group of digits introduced in this way and for the line spacing of the paper. This cycle can be repeated several times, each group of digits being spaced from the next group by means of the key 32. At the end of the entry of microprogram codes, the key 32 is actuated a second time, not preceded by a numeric entry, to signal the end of the codes of the microprogram. The machine thus remains awaiting the introduction of the constant values which serve as a basis for the processing operations. These values are entered by means of the numeric keyboard and, under the control of the microprogram A, are printed and stored in the RAM 10, to be used during the successive executions of a microprogram. At this point, control of the machine returns to the microprogram analyzing the keyboard buffer R9, R10.

Figure 9:
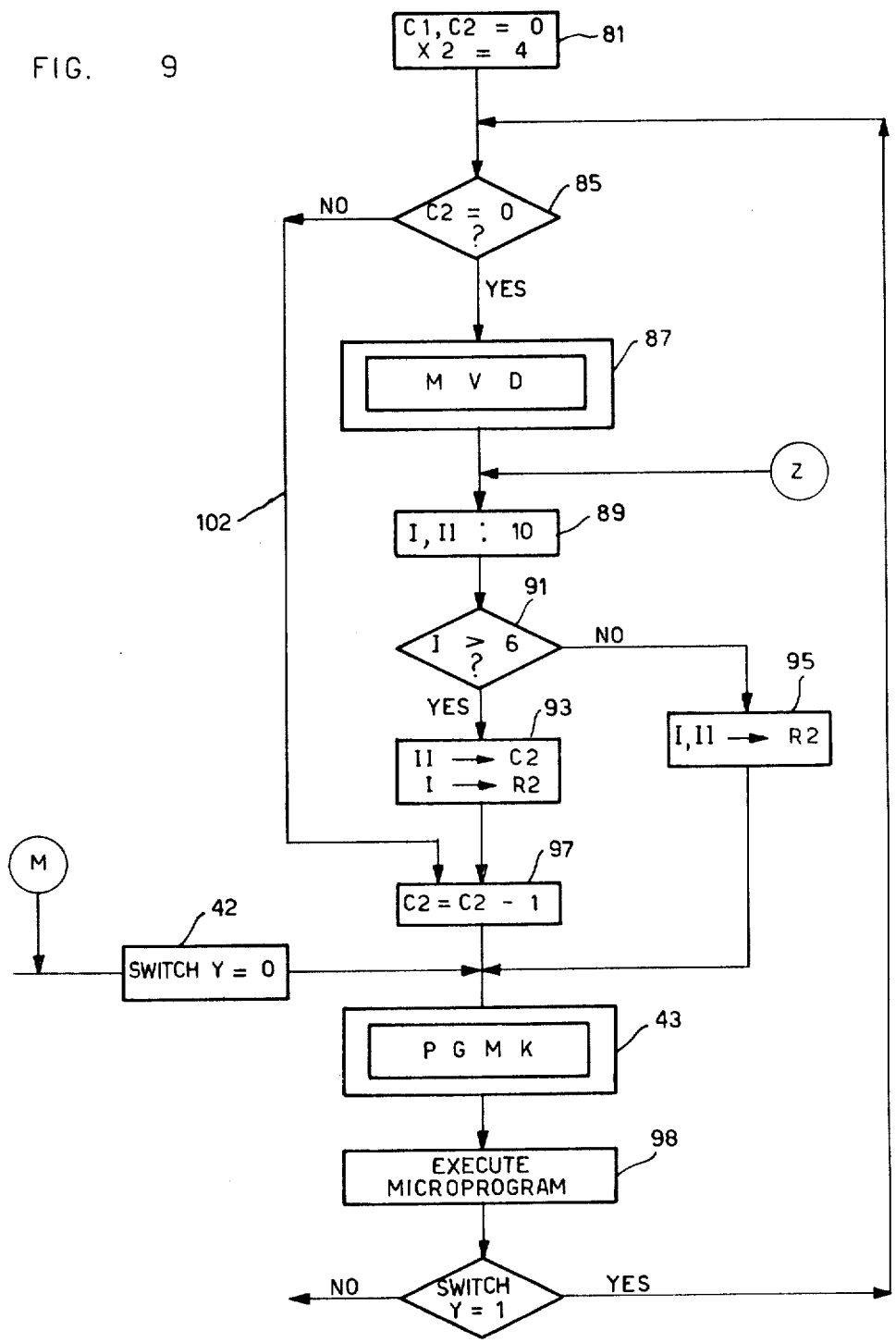
Figure 10:
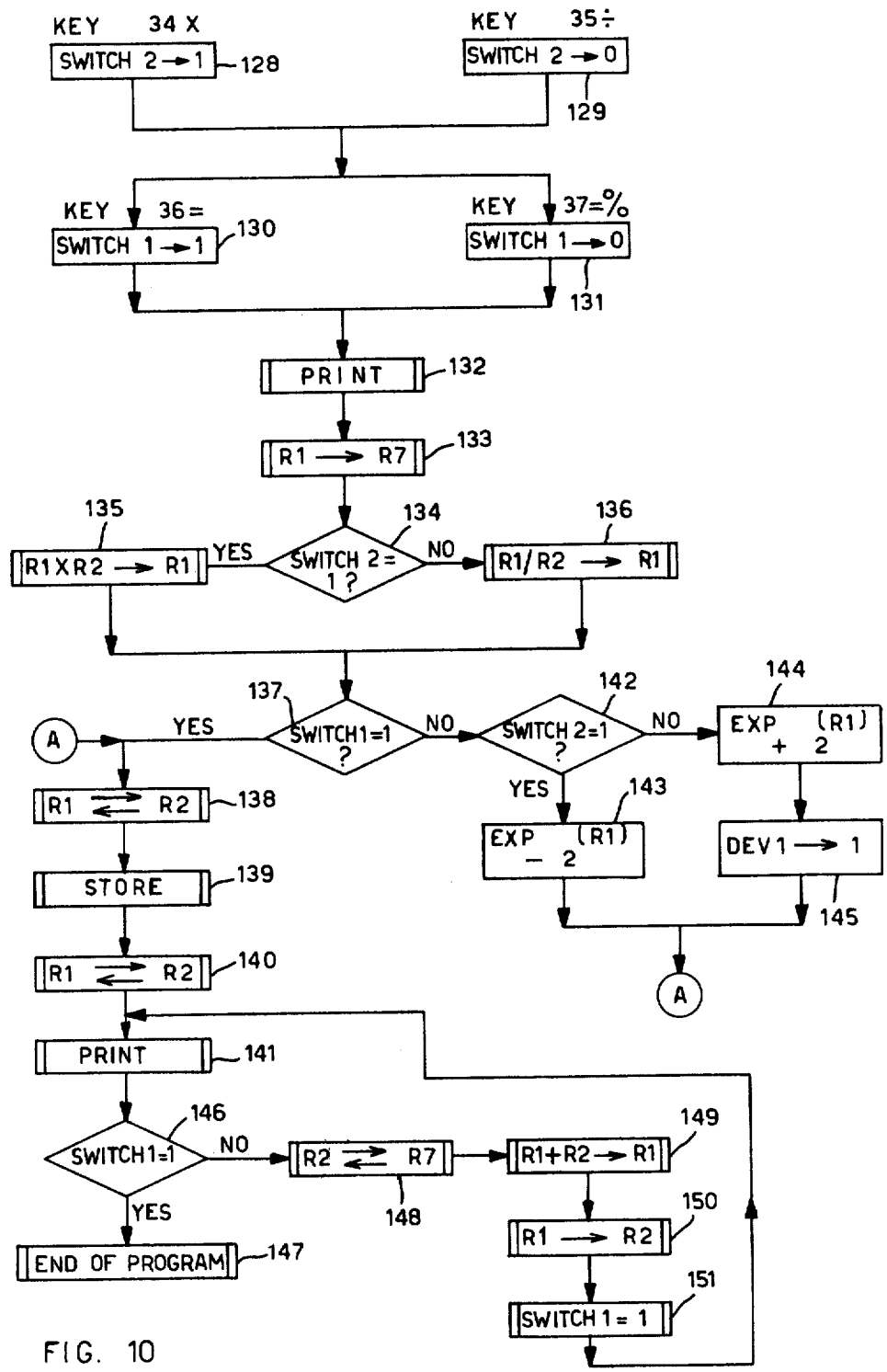

The second of the two special microprograms is that for execution of the program entered from the keyboard, that is "Execution of the stored program" or microprogram B. This can be called by the numeral key 1 followed by the key P41 and, in accordance with the conditions illustrated in the diagram of FIG. 9, provides for isolating from the registers of the RAM 10 in which the microprogram codes have been stored, a pair of digits which identify the respective entered microprogram to be executed, as will be seen better hereinafter. The microprogram B moreover provides for accessing the microprogram corresponding to each pair which is identified in this way, in accordance with the conditions illustrated in the diagram of FIG. 10. This microprogram is thus executed by the basic processing unit 1. The last microinstruction of each microprogram calls the microprogram B, which thus repeats cyclically the operations already mentioned up to the last pair of digits.

During the operations of each microprogram, if the particular processing performed thereby requires the introduction of variable data from the keyboard, the microprogram stops at a particular instruction for enabling the numeric keyboard, in expectation of the introduction by the user of the variable data to be processed.

More particularly, the codes of the successive microprograms entered from the keyboard 2 are recorded by means of the microprograms A in the five registers R4-R8 of the RAM 10 (FIG. 3). Since each register has a capacity of 16 locations, one of which is reserved for the sign and another for the decimal point, fourteen decimal digits can be received in a register, that is seven microprogram addresses. For the purpose of facilitating control of entry for each register, two checks are made, that is one every seven codes. To this end, the programs which can be entered by the user are constituted by sub-routines each composed of seven microprograms and identified by two groups of nine codes each, which can be entered with the numeral keys. Each group of nine codes is constituted by seven codes to be stored plus two check codes (check digits). Of the seven codes to be stored, in the first group of each pair of groups of the first six identify in pairs the first three addresses of the microprograms entered, while the seventh code represents the first code of the fourth microprogram entered. Of the seven codes to be stored in the second group of each pair, the first code completes the address of the fourth microprogram, while the remaining six codes identify in pairs the other three microprograms of the sub-routine. As a whole, each program entered from the keyboard may comprise up to 35 microprogram codes in the five registers R4-R8.

The operations of the microprogram A may be represented schematically in functional blocks interconnected in accordance with the flow diagram of FIG. 8. Initially, after actuation of the key P, the register R2, two switching elements SWITCH 1 and SWITCH 2 of the register R15 and the counter C1 are zeroized in the RAM 10 (FIG. 4) (block 50 in FIG. 8). Moreover, an index register X2 of the register R16 (FIG. 4) used afterwards for addressing the registers R4-R8 indirectly, is initially positioned at the value 4. In fact, it is from the register R4 that the loading of the subroutine codes begins. Thereafter, the contents of the keyboard buffer R9, R10 are examined (examination 51 in FIG. 8). In the event of the buffer R9, R10 being empty, recycling is effected on the examination 51 while awaiting input from the keyboard.

The counter C1 in register R16 of the RAM 10 has a capacity of eight bits and is incremented with each numeral key successively actuated for the group of seven codes of the sub-routine. This incrementing obviously takes place only if the characters entered are recognized as numeric characters in an examination following the entry process itself (block 52), so that if the examination 52 gives a positive result the counter C1 is incremented (block 53).

A further examination 54 of comparison with the number 16 is now performed on the code of C1 for the purpose of recognizing when it is necessary to pass to a following register. In the negative case (the register is not yet fully occupied), the character is transferred to the location of the register R2 (FIG. 4) corresponding to the contents of the counter C1 (block 55). The microprogram A now returns to the examination 51, waiting for another character.

When the examination 54 gives a positive result (capacity of the register R2 exceeded), the counter C1 emits a carry bit. It is not returned to zero in order not to lose the character to be loaded in the first location of the register R2. The register X2 is now incremented in order to access the register of the group R4-R8 following the register already filled (block 56). The possible exceeding of 8 by X2 is now checked (block 57). When X2 exceeds 8, the loading terminates.

When the key 32 (FIG. 4) is struck, which key signals the end of the group of nine characters, the examination 52 of the numeric code in the keyboard buffer gives a negative result. A calculation is now carried out on the first seven codes entered in accordance with a predetermined checking algorithm for the entry operation (routine 58 in FIG. 8). This result is compared with the character currently stored in the location of the register R2 and corresponding to the contents of the character C1, that is the ninth character entered (block 59). In the event of inequality, the error signalling routine is executed (routine 61). In the event of equality, the contents of the counter C1 are reduced by one unit (block 62) and the switching element SWITCH 1 of the register R15 which signals the calculated check digit is examined (block 63).

If the switching element SWITCH 1 is found at zero, as entered initially, it is set (block 64) and the cycle of the blocks 58, 59, 62, 63 is repeated for calculation of the second check digit which is again effected on the seven codes on the basis of a second predetermined algorithm. The result of this second calculation is compared with the character stored in the location of the register R2 which now corresponds to the new contents of the counter C1. After examination of the second check digit, the switching element SWITCH 1 is zeroized again (block 66) and is ready for the examination of the next group of seven digits.

The contents of the register R2 are then transferred to the register of the group R4-R8 (FIG. 3) corresponding to the contents of the index register X2 (block 67). Printing by means of the printer 3 is also commanded (routine 68).

More particularly, a comparison 69 is made of the contents of the counter C1 with the value seven. If the comparison gives C1 as less than 7, the printer 3 is now controlled so as to print only the characters corresponding to the first seven locations of the register R2. If the comparison gives C1 as greater than 7, which occurs at each two groups of seven characters, a shift to the left by seven positions of the register R2 is caused before the printing. In this way, only the printing of seven characters is obtained each time.

After each printing operation, the microprogram A returns to analysis of the keyboard buffer (block 51), waiting for the following characters. This procedure continues until the contents of the register X2 are greater than 8 (examination 57). If after entry of the second group of the fifth pair of seven characters, which pair is recorded in R8, a new numeric code is erroneously entered, the examination 57 gives a positive result and causes a signalling routine which will signal to the user that the entry is not accepted by the machine.

After the entry of the last group of seven codes and the corresponding storage in R4-R8, the user enters the end of the program by again actuating the key 32. To this end, on recognition of the entry by the key 32, before the execution of the routine 58, an examination 72 of the switching element SWITCH 2 of the register R15 (FIG. 4) is effected. As long as the switching element SWITCH 2 is found at zero, calculation of the check digit is commanded. Then when the respective group of seven codes is printed (routine 68 in FIG. 8), the switching element SWITCH 2 is set to 1 (block 73).

If, with the switching element SWITCH 2 at 1, a numeric code is entered, after the transfer of this code to the register R2 (block 55), the switching element SWITCH 2 is reset (block 74), restoring the initial situation for the examination 72.

If, on the other hand, on recognition of the key 32 (examination 51), the examination 72 finds the switching element SWITCH 2 at 1, an end-of-program routine 75 is commanded, so that the machine returns to the manual mode.

It is to be noted that the microprogram A enables only the key 32, in addition to the numeral keys. Therefore, the possible erroneous actuation of other function keys is ignored by the microprogram A and therefore by the machine.

As has been said, the microprogram codes which can be entered in the manner hereinbefore explained, in combination with the key P41, enable the sixty-four microprograms of the external ROM (FIG. 5) to be accessed. It is possible, however, in entering the program, to use by means of the microprogram B also codes of a value higher than 63 and ranging between 70 and 99. To these values, however, there corresponds a routine which comprises the microprogram defined by the tens code, that is "7", "8" and "9", respectively, for the groups of codes 70-79, 80-89, 90-99. The units digit of the code is for indicating in this case how many times the microgram 7, 8 or 9 must be repeated. The routines 70-99 are recorded in the RAM 10 like the other microprograms 00-63.

The operations of the execution microprogram may be represented schematically in functional blocks interconnected in accordance with the flow diagram of FIG. 9. The counter C1 of the RAM 10 (FIG. 3) is now used for addressing the five registers R4-R8 of the RAM 10 which each accommodate seven double characters, microprogram codes stored by means of the microprogram A. A second counter C2, on the other hand, is used for processing the units digit of the codes 70-99 and, therefore, for counting the repetitions of the microprograms 7, 8 and 9. Finally, the index register X2 is used for addressing the double characters of each register R4-R8 indirectly.

The microprogram 8, called by the key 1 followed by the key P, causes at the beginning the zeroizing of the counters C1 and C2 and the setting of the register X2 (block 81). Thereafter, an examination 85 is carried out on the counter C2. If C2 is equal to zero, a routine called MVD (block 87) is carried out.

Figure 7:
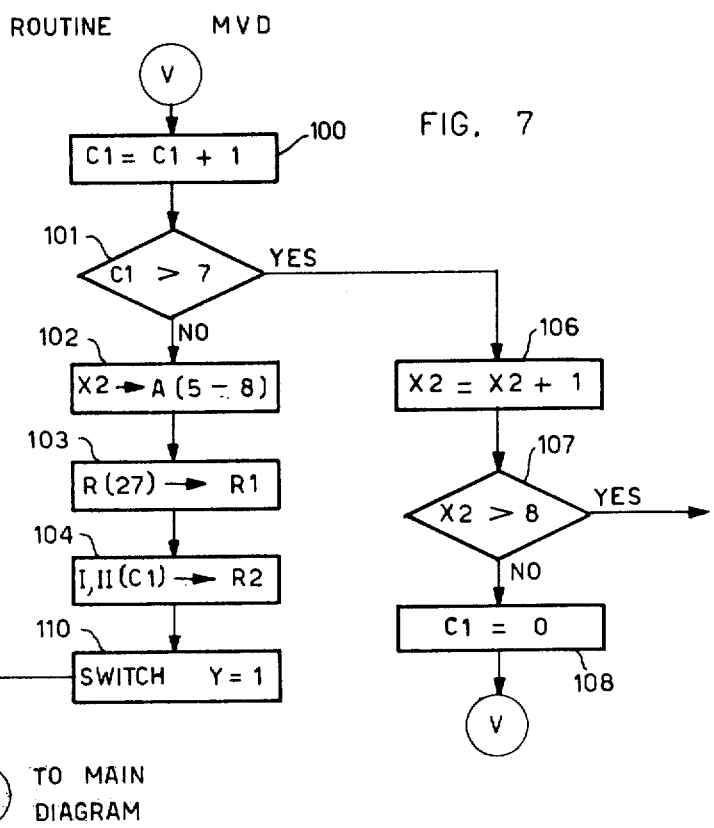

The routine MVD is shown diagrammatically in FIG. 7. It begins with an operation of incrementing the counter C1 used as indirect address of the double character to be extracted from the register R1 (block 100). An examination of the counter C1 is now effected (block 101). If C1 is now less than 7, an operation indicated by the block 102 in FIG. 9 is effected, which transfers the contents of the register X2 to the RAM addresser 27 (FIG. 2). This addresses the register R4–R8 from which it is necessary to extract the contents to be transferred to R1. This is effected in the operation indicated by the block 103 in FIG. 7. Moreover, an operation is effected (block 104) which transfers the double character corresponding to the contents of the register C1 to the register R2. This double character thus identifies the corresponding routine or the corresponding microprogram.

Thus, it is clear that the routine MVD transfers to R1 (FIG. 3) the particular register of the RAM 10 which is addressed by the index register X2, so that it now accesses the double characters of the register R1 in sequence indirectly according to the contents of the counter C1. This will be incremented each time until the limit counting value of 7 is reached.

The double character extracted in this way from R1 is divided into the two decimal digits (block 89 in FIG. 9). The tens digit I is now compared with the value 6 (block 91). If the digit I is less than 6 (block 91), the two digits I and II of the double character are both transferred to the register R2 (block 95). A routine PGMK (block 43), described hereinafter, is then executed and accesses the register R2, the contents of which have been entered therein by the routine MVD, and uses the contents of the register R2 as address of the particular microprogram to be executed. Once the execution of the microprogram has been completed (block 98), the microprogram B returns to the block 83, so that the following pair of characters is extracted from the register R1.

If, on the other hand, the digit I is greater than 6, that is the situation of a repeated microprogram occurs, the second digit, the units digit II, is transferred to the counter C2 and the tens digit is transferred to the register R2 of the RAM 10 (block 93). A first decrementing of the counter C2 is now effected (block 97), after which the execution of the microprogram corresponding to the digit I is effected as in the preceding case. At the end of this execution, when the counter C2 is tested, it now contains the digit II, so that it is different from zero. This causes the microprogram B to jump from the examination 85 to the operation 97, avoiding a fresh code extraction and re-using the preceding code. Another decrementing of the counter C2 is now effected (block 97), so that the microprogram extracted is repeated a number of times equal to the second character of the extracted double character.

Figure 4:
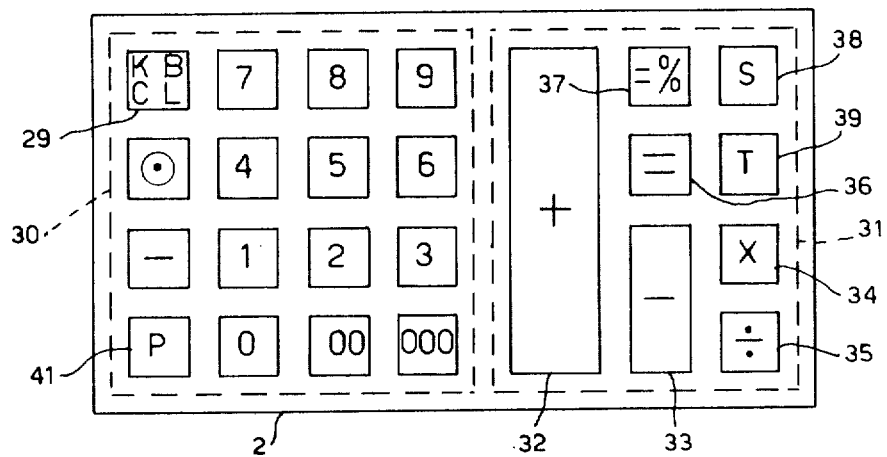
FIG. 4 is a diagram of the keyboard of the computer.

If, on the other hand, C1 is greater than 7 (FIG. 7), the machine goes on to increment the counting register X2 (block 106). This is now examined (block 107) and, if X2 is less than 8, zeroizing of the counter C1 is effected (block 108). If, on the other hand, X2 is greater than 8, the ending of the microprogram is produced, all the 35 double characters having by now been extracted from all the registers R4–R8 of the RAM 10 (FIG. 4).

ROUTINE PGMK

The routine by which the conversion of the numeric code extracted from one of the registers R4–R8 and placed, as has been seen, in the register R2 by the operations of the block 95 or 93 of FIG. 9 into an address useful for identifying the corresponding microprogram of the ROM 4 which it is desired to execute is described with reference to FIG. 6.

The register R13 is first addressed at the cell 2 by putting in the RAM addressing register its address supplied by microinstruction (block 110). The exponent of the register R2 is thus obtained and is sent to the accumulator 21 and compared with 1. This is for the purpose of distinguishing, for example, between 5 and 50 in R2, since each transfer between registers takes place with alignment on the left of the datum transferred (block 111).

If the comparison gives a positive result, this means that the datum contained in R2 is a number consisting of units only, as a result of which a routine of shifting the datum in R2 to the right (block 112) by one place is executed.

At this point, the contents of R2 are compared with 63 (block 113) for the purpose of recognizing a possible error of introduction from the keyboard (it will be remembered that the microprograms which can be addressed are 64 in all).

If the datum is found to be higher than 63, the routine goes on to execute a routine of stopping of the processing and of signalling the error of introduction from the keyboard (block 114). In the opposite case, a transfer of cell 1 of R2 to the accumulator is executed (block 115), followed by a transfer from the accumulator to cell 0 of the register R13 (block 116). In this way, the units digit of the datum in the register R2 is transferred to cell 0 of the register R13.

Cell 0 of the register R2 (that is the tens digit of the datum in R2) is now transferred to the accumulator 21 (block 117) and cell 0 of the register R14 is zeroized (block 118).

By the operations represented by the logic blocks 119, 120, 121, 122 there is obtained the conversion of the datum contained in R2 from the BCD format to the pure binary format, for example the number 55 must be converted from the format 01010101 to the format 110111. This is achieved by adding ten (in binary) to the units digit contained in the register R13, cell 0, as many times as the times indicated by the tens digit, contained in the accumulator (block 120), and adding the carry possibly obtained to cell 0 of the register R14 (block 121). At each adding operation effected in this way, the accumulator is decremented (block 122) and examined to see whether it is equal to 0 (block 119). In the event of such examination giving a positive result, the conversion into binary terminates and first the contents of R14 and then the contents of R13 are transferred to the holding register 18 (block 123). Thereafter, the register 18 is shifted by one bit (block 124) for the purpose of obtaining in this way the multiplication of the number previously transferred by two. This multiplication is necessary, inasmuch as the microinstructions of the ROM 4 which it is desired to address by this routine PGMK each occupy two ROM locations. Thus, if it is desired to address the third microinstruction of the ROM 4, it is necessary to address the sixth location of the ROM 4, and so on. The reason why the 64 microinstructions of the ROM 4 which can be addressed each occupy two locations is explained by the nature of these microinstructions which, being jump microinstructions, must be able to have available an address code longer than the other microinstructions, that is such that any location of the 2048 in the ROM 4 may be accessible by means of them. The address code, therefore, as can be seen in FIG. 5, is constructed out of twelve bits, four in the first location and eight in the second location occupied by the microinstruction.

The last operation of the routine PGMK consists in the duplication of the register 18 in the register 26, which addresses the ROM 4, in the central unit 6.

The subsequent sending of the contents of this register to the ROM 4 permits the desired microprogram to be accessed.

Sequences of Operations

As already mentioned, the key = % 37 (FIG. 4) serves to calculate the discounted or reduced amount or the increased amount. This is effected by a sequence of operations which are carried out by actuating the multiplication key 34 before the key 37. Then there is first calculated the reduction in the case of the setting of a negative rate and the increase in the case of a positive rate by means of a multiplication by the rate divided by one hundred, and then the reduced or increased amount, respectively, by causing the multiplication to be followed by a subtraction or an addition, respectively, and carrying into effect the formula $$a \pm (a \times b/100)$$

If, on the other hand, the division key 35 is actuated before the key = % 37, calculation of the percentage incidence of a given reduction or increase in an amount is effected in accordance with the formula $(a/b) \times 100$. In this case, the sequence comprises a division followed by a multiplication by 100.

In both cases, the actuation of the key = % 37 is substituted for the actuation of the key = 36 which, as already seen, according to whether the key actuated first is the key 34 or the key 35, commands a simple multiplication with unloading of the product or a division with construction of the quotient and the remainder.

As already mentioned, the keys 34, 35, 36 and 37, like all the other function keys, are adapted to enter codes in the RAM 10 each of which addresses a respective program of the ROM 9. More particularly, the keys 36 and 37 enter in the RAM 10 in the address of one and the same program. Therefore, the operations which the computer executes in response to the actuation on the keyboard of the key = % 37 are similar to those carried out in response to the key 36, for which reason the flow diagram of FIG. 10 includes both cases.

Means are provided which can be set directly by the keys 34, 35, 36 and 37 and which are sensed in response to an instruction of the program for selecting given routines for commanding different sequences of operations. More particularly, these means comprise the switching element SWITCH 2 in the RAM 10 (FIG. 3), which is positioned at 1 (operation 128 in FIG. 10) if the key actuated on the keyboard 31 (FIG. 4) is the multiplication key 34, and is positioned at 0 (operation 129) if the key actuated is the division key 35. These means moreover comprise the switching element SWITCH 1 in the RAM 10 (FIG. 3), which is positioned at 1 (operation 130 of FIG. 10) if the key actuated on the keyboard 31 (FIG. 4) is the key 36, while it is positioned at zero (operation 131 of FIG. 10) if the key actuated is the key 37. Before the key 34 or 35 is actuated, the first factor $a$ is entered, which may also be located in memory as the result of preceding operations. After the actuation of the key 34 or 35 and before the actuation of the key 36 or 37, the second factor $b$ is entered, which represents the rate of discount or reduction, in the calculation of the reduced or increased amount (key 34), or the reduction in the case of percentage incidence (key 35).

The program which is executed in response to the actuation of the key 36 or 37 provides instructions for examining the switching elements SWITCH 1 and SWITCH 2 which will enable the operations necessary in the two cases to be distinguished. A first routine of the program commands in each case the printing of the second factor (operation 132 in FIG. 10). There follows a routine of transfer of the register R1 to the register R7 (operation 133) effected for the purpose of preserving the contents of R1 which, in the case of division, represent the dividend and would be lost through the successive decrements of the division.

The program now commands the sensing of the switching element SWITCH 2 (operation 134) and, if this examination gives a positive result, cals a routine of multiplication between the contents of the register R1 and the contents of the register R2 (operation 135). In the opposite case, the program calls a routine of division between the contents of the registers R1 and R2 (operation 136).

The switching element SWITCH 1 is now examined (operation 137). In the event of the examination 137 giving a positive result (actuation of the key 36), there is selected a routine of printing of the result which includes an operation 138 by which the result contained in the resiger R1 is exchanged with the contents of the register R2. There follows an operation 139 by which there is executed the storage in the accumulator register R5 of the result transferred to R2. An operation 140 returns to the registers R1 and R2 the data exchanged before, in order to proceed to the printing of the contents of the register R2 (operation 141).

In the event of the switching element SWITCH 1 being at zero (actuation of the key 37), another examination 142 of the switching element SWITCH 2 is commanded. If this gives a positive result (multiplication key), there is now performed the division by 100 (operation 143) of the result previously obtained in R1, thus obtaining the reduction or increase.

In the event of the examination 142 giving a negative result (division key), there is now executed a multiplication by 100, the calculation of a percentage incidence being concerned in this case (operation 144). Since the machine operates in scientific notation, the division by 100 and the multiplcation by 100 are carried out by respectively subtracting and adding 2 to the units of the exponent of the result in the register R1.

After the operation 144, the switching element SWITCH 1 is not set at 1, as a result of which the prearrangement of the key 37 is cancelled only in the event of the key 35 having been first actuated (percentage incidence).

After the routine 143 or the operation 145, the main program is re-entered and the operations 138-141 are effected as in the case of the key 36, so that in the operation 141 the reduction or increase is printed in one case and the percentage incidence in the other case.

It is therefore clear that the routines of the operations 135, 136, 143, 144 and 145 are selected in response to the actuation of the additional key 37 and as a function of the element SWITCH 2 positioned on actuation of the function key 34 or 35.

After the printing 141, the switching element SWITCH 1 is examined again (operation 146). If the examination gives a positive result, this means either that the operation has been commanded by the key 36 preceded by the key 34 or 35 (simple multiplication or division), or that it has been commanded by the key 37 preceded by the key 35 only (percentage incidence). In both cases, the end of the program is obtained (operation 147) after the printing.

If, on the other hand, the examination 146 gives a negative result (actuation of the key 37 and the key 34), the retrieval of the datum a preserved in the register R7 is effected by exchanging it with the contents of R2 (operation 148), to add it algebraically to the percentage recorded in the register R1 (operation 149). In this way there is obtained in R1 the reduced or increased amount. With a transfer of the contents of the register R1 to the register R2 (operation 150) and setting of the switching element SWITCH 1 at 1 (operation 151), a return is now made to the printing operation 141, which prints the reduced or increased amount. After this, the examination 146 gives a positive result and the routine terminates with the end-of-program operations 147.

It is understood that various modifications may be made in the machine described without departing from the scope of the invention as claimed. For example, memories different from MOS memories may be used, such as magnetostrictive, magnetic disc or optical type memories. Moreover, a non-microprogrammed central unit may be used instead of the microprogrammed central unit hereinbefore described.

What we claim is

1. An electronic desk top computer comprising a keyboard having a set of numeric keys for entering data, a first memory for recording and reading data, a second memory for storing a plurality of programs, said second memory being of the read only type and being removably mounted on the computer, a central processing unit connected to said keyboard and said first and second memories operable under the control of program instructions for processing data, and output means connected to said central processing unit for displaying the output of said electronic desk top computer, wherein the improvement comprises:

a portion of said second memory including a plurality of program registers each associated with one of the plurality of programs in said second memory, each one of said plurality of programs registers storing a jump instruction and the program address of the associated program for controlling a jump to the associated program;

at least one address register in said first memory for temporarily storing the program register address of at least one of said plurality of program registers in said portion of said second memory, the program register addresses of said plurality of program registers in said portion of said second memory being represented by a series of numeric codes in progressive order;

address extracting means connected to said at least one address register in said first memory for extracting the program register address temporarily stored in said at least one address register in said first memory to address the associated program register of said plurality of program registers in said portion of said second memory;

manually operable first control means connected to said address extracting means for controlling the operation of said address extracting means;

recording means connected to said at least one address register in said first memory for conditioning said at least one address register in said first memory to record the program register address of at least one of said plurality of program registers in said portion of said second memory; and manually operable second control means connected to said recording means for controlling the operation of said recording means by enabling said recording means to condition said at least one address register in said first memory to record data entered by said numeric keys of said keyboard as the program register address of at least one of said plurality of program registers in said portion of said second memory.

2. A computer according to claim 1 wherein said first control means operates in response to the joint operation of at least one of said numeric keys of said keyboard and an additional key of said keyboard.

3. A computer according to claim 2 wherein said second control means operates in response to the joint operation of at least another of said numeric keys of said keyboard and said additional key of said keyboard.

4. A computer according to claim 1 wherein said second memory stores an extraction program which is called for conditioning said address extracting means upon the operation of said first control means, and wherein said second memory further stores a recording program which is called for recording the program register address in said at least one address register upon the operation of said second control means.

5. A computer according to claim 4 further comprising scanning means controlled by said extraction program for effecting the sequential extraction of a group of program register addresses recorded in a set of said address registers in said first memory, the extraction of a program register address being effected in consequence of the execution of an end instruction of the program of the preceding program register address.

6. A computer according to claim 5 wherein an autoinstruction program is stored in said second memory, said computer further comprising a third control means conditionable in response to the operation of said additional key and the entry of a predetermined number on said numeric keys for calling said autoinstruction program and means responsive to the execution of said autoinstruction program for conditioning said recording means.

7. A computer according to claim 6 further comprising a counter conditionable in response to the execution of the autoinstruction program to control the transfer of the numeric codes entered by said numeric keys to predetermined addresses in said address registers in said first memory.

8. A computer according to claim 7 wherein said address registers each have a predetermined capacity, said computer further comprising means for testing said counter to group the program register addresses according to the capacity of said address registers.

9. A computer according to claim 8, wherein each group of program register addresses represents a part of a predetermined program and is entered in sequence with a corresponding check digit, said computer further comprising entry checking means for checking each group of program register addresses on the basis of the check digits.

10. A computer according to claim 8, wherein an initialization program is recorded in said second memory for allowing the recording in said first memory of individual program register addresses of programs in said second memory, said computer further including calculating means controllable by said initialization program to calculate the check digits, output means for providing an indication of the calculated check digits and means for recording the group of program register addresses and check digits successively under the control of said autoinstruction program.

11. A computer according to claim 1 further comprising means for recording in said first memory, in addition to the program register address of a predetermined program of said plurality of programs, a number corresponding to the number of desired repetitions of execution of said predetermined program, recognizing means for recognizing this corresponding number, and means controlled by said recognizing means for repeatedly calling said predetermined program a corresponding number of times.

12. A computer according to claim 11, wherein the program register address of each one of said predetermined programs has a format constituted by a predetermined number of decimal digits, and wherein the address of other programs can be entered together with the desired number of repetitions by setting up a group of decimal digits according to said format, said recognizing means being conditionable to recognize at least one of the digits are representing the number of repetitions, and means for integrating the remaining digits to construct addresses according to said format.

13. A computer according to claim 12, wherein the format of said program register addresses is represented by two numeric codes extracted in pairs from said first memory, and comprising a transit register for temporarily recording the extracted pair of codes, said recognizing means sensing said transit register for recognizing a first one of the codes, transfer means controlled by said recognizing means for transferring the second numeric code to a counter when a first numeric code has predetermined values, and means for decrementing said counter at each execution of the respective program until it is zeroized.

14. A computer according to claim 1 further comprising a set of function keys on said keyboard, entering means conditionable by at least one of said function keys for entering the address of a corresponding program of said second memory, a set of elements being associated with other function keys and being settable directly by said other function keys during execution of said corresponding program for indicating a branching condition of said corresponding program, testing means for testing said elements so set in response to a predetermined instruction of said corresponding program for accordingly branching same, and selecting means conditionable by said testing means for selecting a routine of said corresponding program defined by said set of elements.

15. A computer according to claim 14, wherein the said predetermined function key is a percentage key and the said other function keys include a division key, said selecting means selecting in response to the sensing of the element set by said division key, a series of routines causing the central unit to process the percentage given by the formula (b/a) $\times$ 100, the quantities b and a being stored in said first memory.

16. A computer according to claim 14, wherein said predetermined function key is a percentage key and said other function keys include an addition key, a subtraction key and a multiplication key, said selecting means selecting in response to the sensing of the element set by said multiplication key a series of routines including the routines corresponding to the elements set by said multiplication key and one of said addition and subtraction keys a series of routines causing the central unit to process the multiplication of a given capital $a$ for a given percentage $b$, followed by an algebraic sum of the said capital with the said percentage, in accordance with the formula $a \pm (a \times b/100.)$

* * * * *